US006738436B1

United States Patent
Harres

(10) Patent No.: US 6,738,436 B1
(45) Date of Patent: May 18, 2004

(54) FIXED AND VARIABLE DATA-RATE, MATCHED-FILTER RECEIVER

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 675 days.

(21) Appl. No.: 09/621,899

(22) Filed: Jul. 19, 2000

(51) Int. Cl.[7] ............................ H03D 1/00; H04L 27/06
(52) U.S. Cl. ........................................................... 375/343
(58) Field of Search ................................. 375/343, 365, 375/239; 250/214 AG; 356/28; 708/816, 3; 327/553

(56) References Cited

U.S. PATENT DOCUMENTS

| | | | | |
|---|---|---|---|---|
| 4,730,265 A | * | 3/1988 | Bjornholt ........................ 708/3 |
| 4,808,939 A | * | 2/1989 | Kingston ..................... 327/553 |
| 4,979,186 A | * | 12/1990 | Fullerton ..................... 375/239 |
| 5,600,128 A | * | 2/1997 | Lindstrom ........... 250/214 AG |

* cited by examiner

Primary Examiner—Stephen Chin
Assistant Examiner—Curtis Odom
(74) Attorney, Agent, or Firm—Harness Dickey & Pierce P.L.C.

(57) ABSTRACT

A matched-filter receiver includes a detector that generates a current signal based on light input thereto. An integrating circuit has an input that is connected to the detector. The integrating circuit integrates the current signal and outputs an integrated signal. A delay circuit is connected to an output of the integrating circuit. The delay circuit delays the integrated signal for a first duration. A comparator circuit includes an inverting input that is connected to the output of the integrating circuit and to an output of the delay circuit. The integrating circuit includes a resistor having a parasitic capacitance. The integrating circuit includes an amplifier circuit that amplifies the integrated signal. The duration that the delay circuit delays the integrated signal can be set to a plurality of duration values. The comparator provides an output signal having one of a first state and a second state. A decision circuit that is connected to the comparator provides a binary decision signal. A clock circuit provides a clock signal having clock edges. The decision circuit includes a flip-flop circuit that is connected to the clock circuit. The flip-flop circuit latches the output of the comparator immediately following at least one of the clock edges.

15 Claims, 4 Drawing Sheets

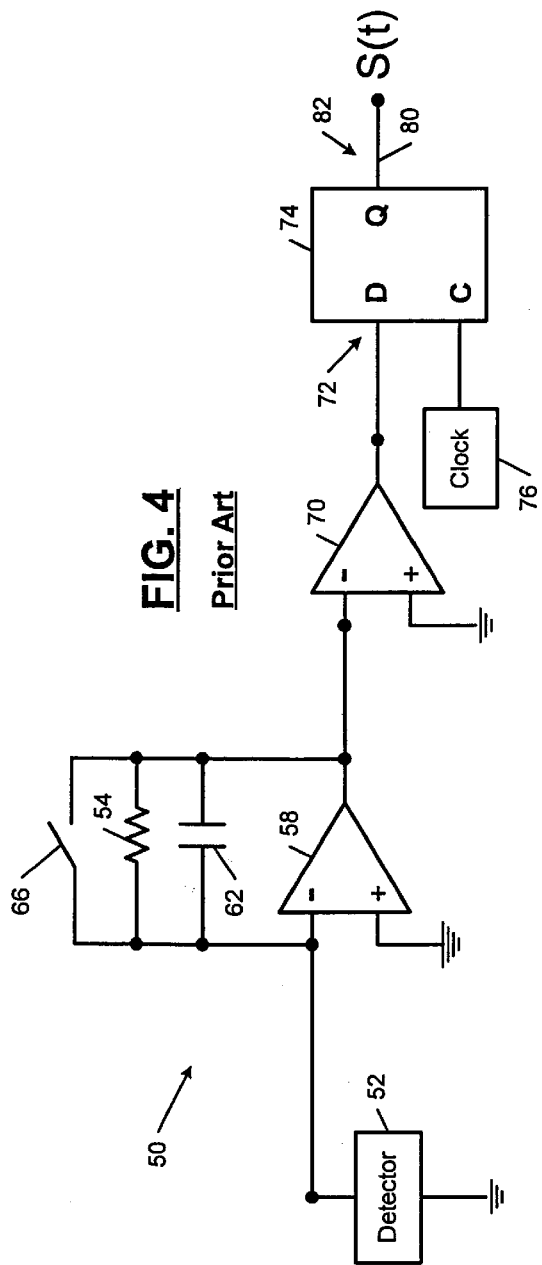
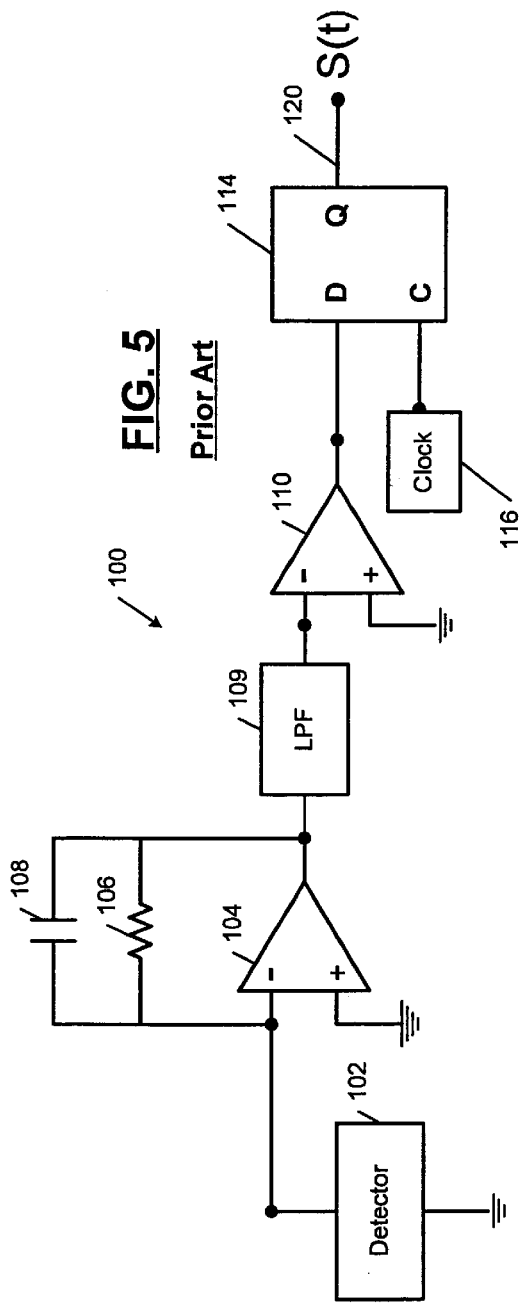

FIXED AND VARIABLE DATA-RATE, MATCHED-FILTER RECEIVER

TECHNICAL FIELD

This invention relates to receivers for optical communications systems. More particularly, this invention relates to a matched-filter receiver for an optical communications system that is capable of handling fixed and/or variable data rates.

BACKGROUND OF THE INVENTION

High-speed receivers for free-space and fiberoptic-based optical communications systems generally include a detector that is connected to a transimpedance amplifier that has an output connected to a low pass filter. A binary decision circuit is connected to the low pass filter. Sometimes the low pass filter is integrated with the transimpedance amplifier circuit. This arrangement approximates the performance of matched-filter designs that are known to be an optimal method for detecting signals. However, this arrangement emphasizes high-frequency noise more than the optimal matched-filter design and therefore results in lower receiver sensitivity.

Conventional matched-filter receiver designs also trade off signal-to-noise (S/N) and receiver sensitivity in order to achieve wider bandwidths that are required by high-speed data communications. In the transimpedance amplifier, a resistor and its stray capacitances define a time constant for the receiver. Oftentimes the design employs a low-value resistor to provide a relatively small time constant that is required for high-speed data communications. The use of the low-valued resistor, however, increases the current noise generated by the resistor. The current noise typically dominates the noise performance of the receiver.

Receiver designs may also need to accommodate multiple data rates. The conventional receiver designs that employ the transimpedance amplifier, the low pass filter and the current-to-voltage conversion resistor optimize performance for a single data rate only. A significant decrease in receiver sensitivity results if the receiver is used for multiple data rates.

SUMMARY OF THE INVENTION

A matched filter receiver according to the invention includes a detector that generates a current signal based on light input thereto. An integrating circuit has an input that is connected to the detector. The integrating circuit integrates the current signal and outputs an integrated signal. A delay circuit is connected to an output of the integrating circuit. The delay circuit delays the integrated signal for a first duration. A comparator circuit includes an inverting input that is connected to the output of the integrating circuit and to an output of the delay circuit.

According to other features of the invention, the comparator provides an output signal having one of a first state and a second state. The matched-filter receiver further includes a decision circuit that is connected to the comparator and that provides a binary decision signal. A clock circuit provides a clock signal having clock edges. The decision circuit includes a flip-flop circuit that is connected to the clock circuit. The flip-flop circuit latches the output of the comparator immediately following at least one of the clock edges.

According to still other features of the invention, the integrating circuit includes a resistor having a parasitic capacitance. The resistor has a resistance value that is greater than or equal to 50 kilo ohms. The integrating circuit includes an amplifier circuit that amplifies the integrated signal.

According to other features of the invention, the duration that the delay circuit delays the integrated signal can be set to a plurality of duration values.

Still other objects, features and advantages will be apparent from the specification, the claims and the drawings.

BRIEF DESCRIPTION OF THE DRAWINGS

FIG. 4 illustrates a matched-filter receiver circuit according to the prior art;

FIG. 5 illustrates an approximated matched-filter receiver circuit according to the prior art;

DETAILED DESCRIPTION OF THE PREFERRED EMBODIMENTS

The ensuing detailed description provides preferred exemplary embodiments only and is not intended to limit the scope, applicability, or configuration of the invention. Rather, the ensuing detailed description of the preferred exemplary embodiments will provide those skilled in the art with an enabling description for implementing a preferred exemplary embodiment of the invention. It being understood that various changes may be made in the function and arrangement of elements without the departing from the spirit and scope of the invention as set forth in the appended claims.

Figure 1:
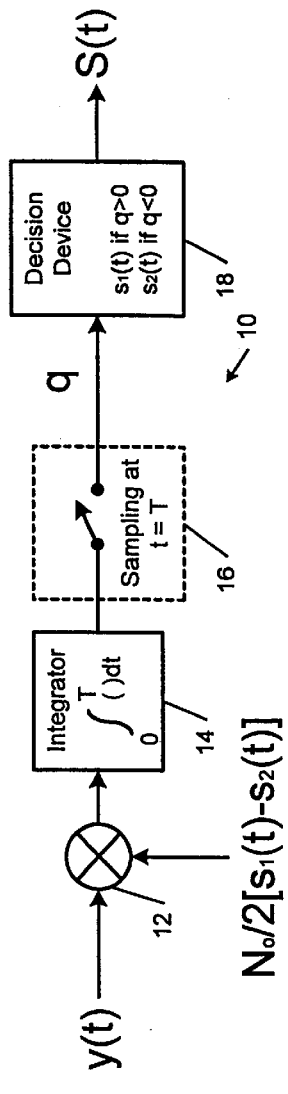
FIG. 1 is a block diagram illustrating an ideal matched-filter receiver that generates a binary decision signal according to the prior art.

Referring now to FIG. 1, an ideal matched-filter receiver for binary signals is illustrated and is identified at 10. The following discussion assumes that an incoming signal y(t) includes a plurality of non-return-to-zero (NRZ) pulses that are contaminated by additive white Gaussian noise (AWGN). When binary signals are employed, the ideal matched-filter receiver 10 multiplies the incoming signal by a difference signal equal to $N_0/2$ $[s_1(t)-s_2(t)]$ at 12. The signal $s_1(t)$ is a first possible received signal. The $s_2(t)$ is a second possible received signal. $N_0$ is the power spectral density of the AWGN.

The product is integrated over a time interval T at 14. The integrated product is sampled at 16 at a time interval T. At an end of the interval T, a decision is made by a decision device 18 as to which signal $s_1(t)$ or $s_2(t)$ was sent. The decision device 18 selects $s_1(t)$ if q is greater than zero and $s_2(t)$ if q is less than zero. The decision device 18 provides a binary decision signal S(t).

Figure 2:
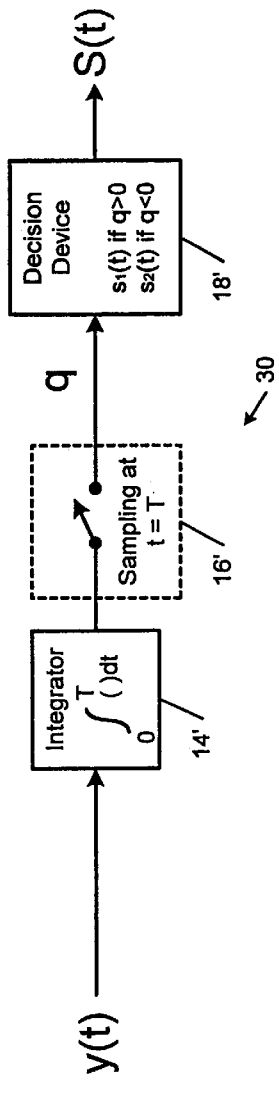
FIG. 2 is a simplified ideal matched-filter receiver that can be used when non-return-to-zero (NRZ) signals are used according to the prior art.

Referring now to FIG. 2, a simplified ideal matched-filter receiver 30 can be employed if the NRZ signals are represented by positive or negative pulses $s_1(t)=+A$ or $s_2(t)=-A$.

In this situation, a second multiplicand that is input to the multiplier 12 in FIG. 1 simplifies to a constant $N_0$. The constant is present because of the AWGN. The constant merely scales the result at the decision device 18'. Since the decision is checked for polarity only, the constant is set to one with no degradation of receiver performance. The result is the simplified matched-filter receiver 30.

Figure 3:
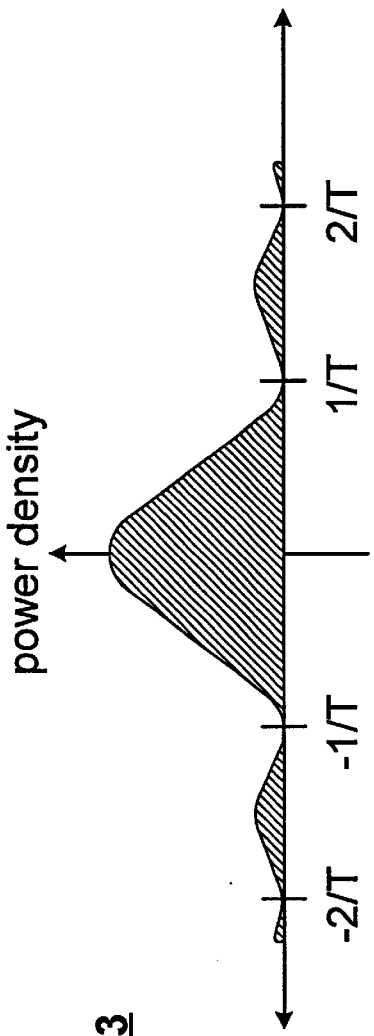
FIG. 3 illustrates the power spectrum of a bipolar NRZ signal.

Referring now to FIG. 3, the incoming signal y(t) and the simplified matched-filter receiver 30 both have a frequency spectrum that is illustrated in FIG. 3. The simplified matched-filter receiver 30 is matched to the incoming signal both in the time domain and the frequency domain to provide maximum signal-to-noise (S/N) ratio. If the two NRZ signals are positive and 0 (in other words $s_1(t)=A$ and $s_2(t)=0$ such as in optical communications systems) instead of bipolar, there will simply be an extra impulse in the spectrum at DC and the receiver structure does not change. In FIGS. 1 and 2, the limits of the integral are 0 and T. If a pulse starts at a time $t_n$, then the integration limits are $t_n$ and $t_n+T$. The sampling switches 16 and 16' would be closed at time $t_n+T$.

The simplified ideal matched-filter receiver 30 of FIG. 2 is implemented for low-speed receiver applications in the matched-filter receiver 50 in FIG. 4. The matched-filter receiver 50 includes an optical detector 52 and a first resistor 54. One end of the resistor 54 is connected to an incoming signal yet) provided by the detector 52 and to the inverting input of an operational amplifier (op amp) 58. The other end of resistor 54 is connected to the output of the op amp 58. A non-inverting input of the op amp 58 is connected to ground. The inverting input of the op amp 58 is connected to one end of a capacitor 62 and to a switch 66. The switch 66 can be electronically actuated. The switch 66 closes at a predetermined interval to reset the integrator. The switch 66 and an opposite end of the capacitor 62 are connected to an output of the op amp 58. The output of the op amp 58 is connected to an inverting input of a comparator 70. For the case of bipolar input levels, the non-inverting input of the comparator 70 is connected to ground. An output of the comparator 70 is connected to a "0" input of a 0 type flip-flop 74. The switch 66 closes momentarily at time $t=t_n+T$. A clock output of a clock 76 occurs at time $t=t_n+T$. The clock output is connected to a clock input of the flip-flop 74. A binary decision signal 80 Set) is output by a "Q" output of the flip-flop 74. The clock 76 latches the flip-flop to provide sampling.

At higher speeds, the matched-filter receiver 50 becomes impractical because of the time required to reset the integrator by momentarily shorting the capacitor 62. For example at a 1 Giga (G) bit per second (Gb/s) data rate, the "momentary" reset period should be a small fraction of the one nanosecond (ns) bit interval. The reset must be performed within a few tenths of a picosecond (ps). Because these discharge times are nearly impossible to achieve in a small, inexpensive circuit, most high-speed receiver designs incorporate an approximation to the matched-filter as will be described below.

Referring now to FIG. 5, an approximated matched-filter receiver 100 is illustrated and includes a detector 102 having an output connected an inverting input of an op amp 104. A resistor 106 has one end connected to the inverting input of the op amp 104 and an opposite end connected to an output of the op amp 104. A capacitor 108 has one end connected to the inverting input of the op amp 104 and an opposite end connected to the output of the op amp 104. The output of the op amp 104 is connected to a low pass filter 109. An output of the low pass filter 109 is connected to an inverting input of a comparator 110. A non-inverting input of the comparator 110 is connected to ground. An output of the comparator 110 is connected to a "D" input of a flip-flop 114. A clock 116 provides pulses at time $t=t_n+T$ to a clock input of the flip-flop 114. A binary decision signal 120 S(t) is provided at a "Q" output of the flip-flop 114.

Figure 6:
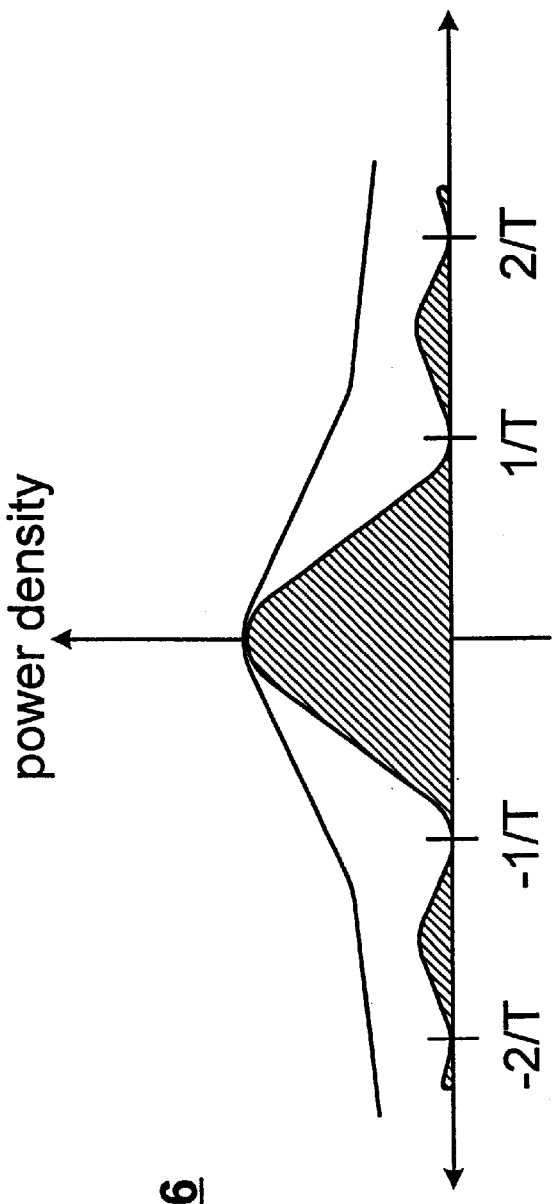
FIG. 6 illustrates the power spectrum for a low pass filter approximation to the matched-filter receiver for NRZ data.

Referring now to FIG. 6, the frequency response differences between the ideal matched-filter receiver 50 and the approximated matched-filter receiver 100 are illustrated. The low pass filter in the approximated matched-filter receiver 100 passes considerably more high frequency energy than the ideal matched-filter receiver 50. Noise at the higher frequencies is passed by the approximated matched-filter receiver 100 with considerably more gain than would otherwise have occurred with the ideal matched-filter receiver. FIG. 6 suggests that the bandwidth of the approximated matched-filter receiver 100 could be increased in an effort to more closely approximate the response of the ideal matched-filter receiver 50. Unfortunately, these techniques increase intersymbol interference (ISI) to an undesirable level. Simply decreasing the filter bandwidth or increasing the filter order, although reducing the noise that is passed, degrades receiver performance due to ISI. Ultimately these approaches must compromise by finding a low pass filter that gives the best trade off between random noise and ISI.

A further limitation to sensitivity in high-speed receiver designs arises from the fact that the current-to-voltage resistor must be set low enough to ensure that the combination of the resistor and the parasitic capacitance of the resistor result in sufficient bandwidth to pass the signal. Often the thermal current noise generated by the low-value resistor contributes a significant portion of the overall receiver noise. The low-value resistor therefore limits the receiver sensitivity. In order to minimize the resistor noise, the resistor is often selected so that the resistor and the parasitic capacitance of the resistor form the low pass filter in the approximated matched-filter receiver 100.

Further complications arise when changing the data rate of the receiver. Oftentimes, applications require the data rate to be changed. For example, the data rate may be changed between 1 Gb/s and 2 Gb/s. This is preferably done by changing a logic input to the receiver or by communicating the change through some other mechanism. With conventional designs, the approximated matched-filter receiver and current-to-voltage conversion resistor are optimized for a particular data rate. When changing to a new data rate, the approximated matched-filter receiver is not optimized and is less sensitive than it would be if it had been designed for a single data rate.

Figure 7:
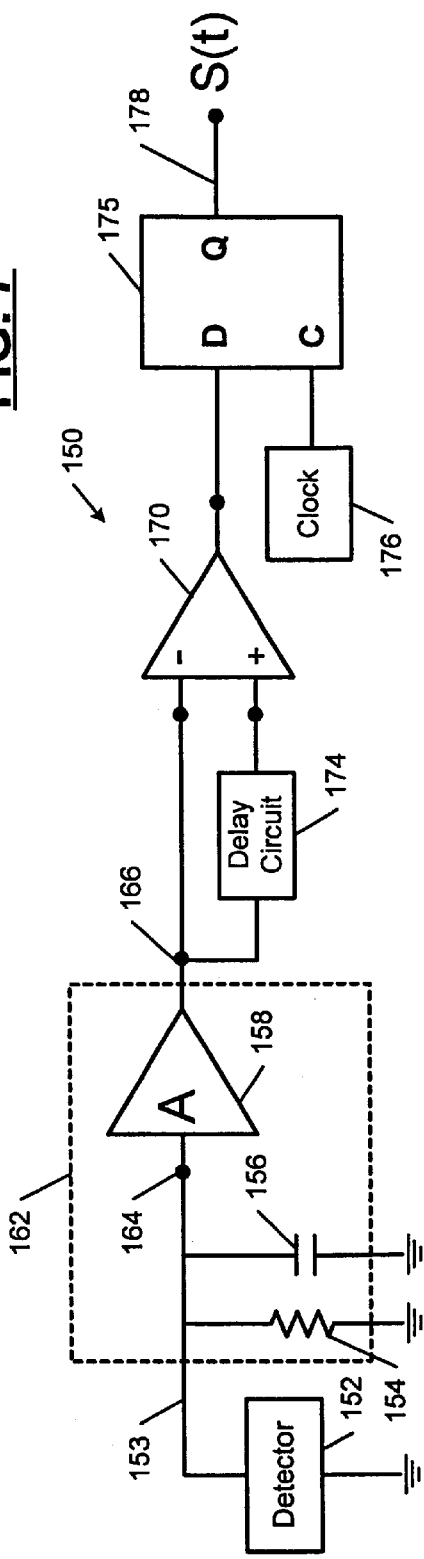
FIG. 7 illustrates a matched-filter receiver according to the present invention for a single data rate.

Referring now to FIG. 7, a matched-filter receiver 150 according to the present invention is illustrated and includes a detector 152 that provides a current signal that is based on light that is input to the detector 152. The light can be received from free space such as point-to-point laser light sources or light carried by lines. A resistor 154 has one end connected to an output of the detector 152 and to an input of an amplifier 158. The resistor 154 preferably has a resistance value that is greater than or equal to 50 kilo ohms to reduce thermal noise. A parasitic capacitance 156 of the resistor 154 is in parallel to the resistor 154. An opposite end of the resistor 154 is connected to ground. The resistor 154, the parasitic capacitance 156 and the amplifier 158 form an integrating circuit 162. The integrating circuit 162 integrates and amplifies the current output signal 153 and generates an integrated signal 164 that is input to an inverting input of a comparator 170 and to a delay circuit 174. The delay circuit 174 delays the integrated signal for a predetermined delay duration. In one embodiment, the delay duration is a multiple of the period T.

An output of the delay circuit 174 is input to a non-inverting input of the comparator 170. An output of the comparator 170 is input to a "D" input of a flip-flop 175. A clock 176 outputs a clock signal to a clock input of the flip-flop 175 that occurs at t=$t_n$. A binary decision signal S(t) 178 is output by a "Q" output of the flip-flop 175.

In the matched-filter receiver 150 according to the present invention, the current-to-voltage conversion resistor 154, the parasitic capacitance 156 and the amplifier 158 form the integrating front end. Generally the integrating effect of the resistor 154, the parasitic capacitance 156 and the amplifier 158 is usually equalized in later stages and requires a switched integrator that was discussed above in conjunction with FIG. 4. In the matched-filter receiver 150 according to the invention, no further equalization is required to achieve the high input resistance that lowers receiver noise. Simply including a delay of T produces a running integral with a value equal to:

$$A \int_{t_n-T}^{t_n} i_d \, dt$$

at the comparator inputs at time $t_n$. Here, $i_d$ is the detector current. Furthermore, the matched-filter receiver 150 has the optimal matched-filter response. The delay circuit 174 provides a delay having a first duration and is fairly easy to generate when T is one ns or less.

Figure 8:
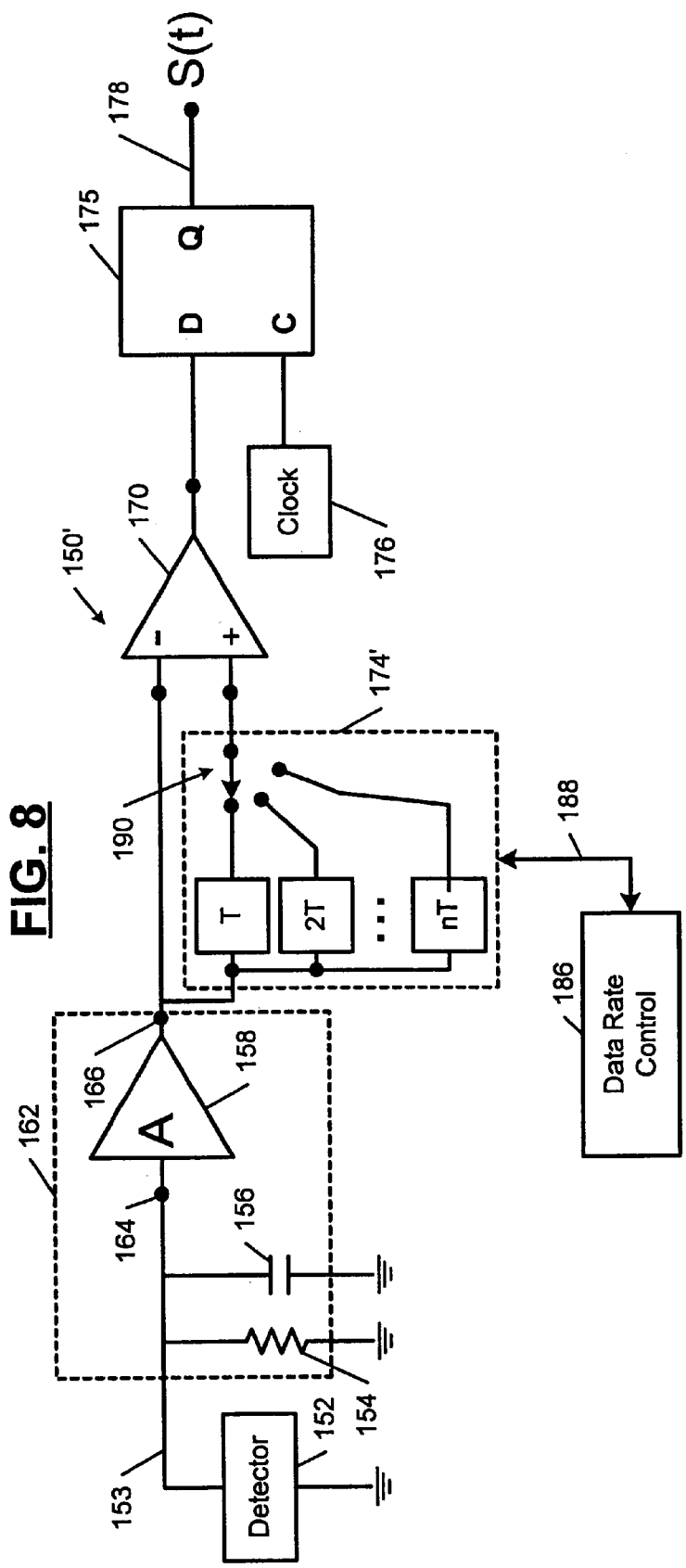
FIG. 8 illustrates a matched-filter receiver according to the present invention for multiple data rates.

Referring now to FIG. 8, reference numerals from FIG. 7 have been used where appropriate. An alternate matched-filter receiver 150' for multiple data rates is shown. The delay circuit 174' provides a variable delay duration that is controlled using a physical switch or electronically using a data rate control 186 that generates a data rate control signal 188. For example, when switching between 1 Gb/s, 2 Gb/s, 3 Gb/s, and n Gb/s data rates, the data rate controller 186 switches a switch 190.

As can be appreciated, the matched-filter receiver according to the invention provides matched-filter performance, eliminates resistor noise and achieves optimum S/N performance. In addition, the matched-filter receiver can handle multiple data rates without adversely impacting performance.

While the principles of the invention have been described above in connection with specific apparatus, is to be clearly understood that this description is made only by way of example and not as a limitation on the scope of the invention.

What is claimed is:

1. A matched-filter receiver comprising:
   a detector that generates a current signal based on light input thereto;
   an integrating circuit comprising a resistor having a parasitic capacitance and an amplifier, said integrating circuit having an input that is connected to said detector, said integrating circuit adapted to integrate and amplify said current signal and output an integrated signal;
   a delay circuit that is connected to an output of said amplifier of said integrating circuit and that delays said integrated signal for a first duration; and
   a comparator circuit that includes an inverting input that is connected to said output of said integrating circuit and to an output of said delay circuit.

2. The matched-filter receiver of claim 1 wherein said resistor has a resistance value that is greater than or equal to 50 kilo ohms.

3. The matched-filter receiver of claim 1 wherein the duration that said delay circuit delays said integrated signal can be set to a plurality of duration values.

4. The matched-filter receiver of claim 1 wherein said comparator provides an output signal having one of a first state and a second state.

5. The matched-filter receiver of claim 1 further comprising a decision circuit that is connected to said comparator for providing a binary decision signal.

6. The matched-filter receiver of claim 5 further comprising:
   a clock circuit for providing a clock signal having clock edges.

7. The matched-filter receiver of claim 6 wherein said decision circuit includes:
   a flip-flop circuit connected to said clock circuit for latching the output of said comparator immediately following at least one of said clock edges.

8. A method of receiving a light signal comprising the steps of:
   detecting a light signal utilizing a detector;
   generating a current signal based on said light signal utilizing said detector;
   integrating and amplifying said current signal and generating an integrated signal utilizing an integrating circuit comprising a resistor having a parasitic capacitance and an amplifier, said integrating circuit having an input that is connected to said detector;
   delaying said integrated signal for a first duration and generating a delayed signal utilizing a delay circuit that is connected to an output of said amplifier of said integrating circuit; and
   comparing said integrated signal to said delayed signal using a comparator that includes an inverting input that is connected to said output of said integrating circuit and to an output of said delay circuit.

9. The method of claim 8 further comprising the step of:
   providing an output signal from said comparator that has one of a first state and a second state.

10. The method of claim 9 further comprising the step of:
    providing a clock signal having clock edges.

11. The method of claim 10 further comprising the step of:
    latching the output signal immediately following at least one of said clock edges.

12. The method of claim 8 wherein the duration can be varied.

13. A matched-filter receiver comprising:
    a detector for generating a current signal that is related to light received by said detector;
    an integrating circuit that includes an amplifier and a resistor and that has an input that is connected to an output of said detector, wherein said resistor has a value that is greater than or equal to 50 kilo ohms;
    a delay circuit having an input and an output, wherein the input is connected to an output of said amplifier of said integrating circuit;
    a comparator having an inverting input connected to the output of said integrating circuit and a non-inverting input that is connected to said output of said delay circuit;
    a decision circuit that is connected to an output of said comparator and that generates a binary decision signal.

14. The matched-filter receiver of claim 13 further comprising:
    a clock circuit for providing a clock signal having clock edges.

15. The matched-filter receiver of claim 14 wherein said decision circuit includes:
    a flip-flop circuit connected to said clock circuit for latching the output of said comparator immediately following at least one of said clock edges.

* * * * *